United States Patent [19]

Payne et al.

[11] Patent Number: 5,626,899
[45] Date of Patent: May 6, 1997

[54] PROCESS FOR MAKING VEGETABLE-BASED MEAT EXTENDERS

[75] Inventors: Tony Payne; Russ Egbert, both of Decatur, Ill.

[73] Assignee: Archer Daniels Midland Company, Decatur, Ill.

[21] Appl. No.: 482,878

[22] Filed: Jun. 7, 1995

[51] Int. Cl.$^6$ .................. A23L 1/052; A23J 3/14
[52] U.S. Cl. .............. 426/574; 426/506; 426/518; 426/519; 426/575; 426/577; 426/578; 426/615; 426/656; 426/802
[58] Field of Search ................. 426/656, 574, 426/615, 802, 575, 577, 578, 506, 455, 518, 519

[56] References Cited

U.S. PATENT DOCUMENTS

| | | | |
|---|---|---|---|
| 4,173,657 | 11/1979 | Gaudio et al. | 426/574 |
| 4,563,360 | 1/1986 | Soucie et al. | 426/104 |
| 4,777,059 | 10/1988 | Tanaka et al. | 426/656 |
| 4,863,749 | 9/1989 | Yamada | 426/656 |
| 5,160,758 | 11/1992 | Parks et al. | 426/506 |
| 5,433,969 | 7/1995 | McMindes et al. | 426/656 |

*Primary Examiner*—Esther Kepplinger
*Assistant Examiner*—Lien Tran
*Attorney, Agent, or Firm*—Laff, Whitesel, Conte & Saret, Ltd.

[57] ABSTRACT

A vegetable protein crumble for use as a meat extender to replace portions of lean and/or fat is made from one part soy protein isolate hydrated in about 3.5–5.0 parts water at ambient temperature and then chopped. A vegetable protein and/or complex carbohydrate is added to the resulting mixture, and again chopped. Then the resulting composition is cooled overnight before being chopped or ground into crumbles. By way of example, a use of the crumble is described as a meat extender in pepperoni.

8 Claims, No Drawings

PROCESS FOR MAKING VEGETABLE-BASED MEAT EXTENDERS

This invention relates to processes for using vegetable protein as meat enhancers and extenders, and more particularly to means for and methods of reducing costs, especially handling costs, for such meat extenders.

BACKGROUND

For a background reading about meat extenders, reference may be made to one or more of the following United States patents and the references cited thereon: 5,183,683; 5,160,758; and 4,276,319.

In order to provide a concrete example of a product using the inventive vegetable meat extender or "crumble", reference is made herein to a pepperoni product. However, this specific reference is not a limitation on the appended claims. Quite the contrary, the invention may find use in many coarse ground meat systems, for example, sausage, ground beef patties, etc.

Because consumers, processors, and regulatory agencies are changing their attitudes, the use of soy protein products is increasing in processed meat systems. These soy products are added to various meat products in order to reduce their costs, improve their health qualities, etc. The soy products contribute nutrition, flavor, and valuable functional properties when used as partial meat substitutes, binders, emulsifiers, meat flavor enhancers, brine ingredients, and meat analogs.

Most of the current domestic meat applications for soy protein are in comminuted and coarsely ground meat products, with the coarsely ground meat being the largest area. In finely chopped meats, such as frankfurters and bologna, soy protein isolates are used for their moisture and fat binding, fat emulsifying, and stabilizing properties. These functional properties make them ideal ingredients for use in processed meat products, both coarse and fine emulsions (e.g., patties, loaves, and sausages).

In these meats (meat patties, meat balls, chili, Salisbury steaks, pizza toppings, and meat sauces among others) textured soy proteins are the ingredients of choice. When making patties, it is necessary to add water at 2 to 3 times the weight of the textured soy protein. If too little water is used to hydrate the textured protein, the finished meat product is too dry. A good guide for hydrating soy products is to achieve a protein level of about 18% in the hydrated form.

In patties, the primary functions of soy protein products are to give structure during cooking and to reduce cooking losses. When properly used, the patty is more moist, will have a higher protein content and lower fat, and thus be better balanced nutritionally.

Several studies with beef patties containing soy protein products indicate that up to 20% hydrated textured soy protein product would be acceptable to the consumer, based on various palatability characteristics. In supplementing ground meat in a patty-type product, up to about 20% substitutions can be made without flavor adjustment. Above this level, additional seasonings may be required to offset the dilution effect of the meat flavor.

The flaked form in a textured soy product assures rapid hydration, which makes the ingredient well-suited for high volume applications. Its meat-like appearance and mouth-feel remain intact throughout strenuous retort and freeze-thaw conditions. It also contributes to overall fat stabilization.

Isolated soy proteins are by far the most versatile of the soy derivatives. Isolates are the most highly refined soy protein products which are commercially available, but they also represent the major proteinaceous fraction of the soybean. Soy protein isolates are prepared from dehulled and defatted soy-beans by removing most of the non-protein components so that the remaining product contains not less than 90% protein on a moisture-free basis.

These soy protein isolates can be utilized to impart such properties as viscosity, adhesiveness, cohesiveness, springiness, and juiciness, and are highly dispersible, soluble and functional products. In meat applications, they are designed to replace a portion of salt soluble meat proteins, bind fat and water, stabilize emulsions and help ensure maintenance of the structure in finished cooked products. Matching specific functional requirements with the proper selection of these isolated soy proteins will result in cost savings and process efficiencies.

Soy protein concentrates are derived from defatted soy flakes through an aqueous alcohol process or acid precipitation. Soy protein concentrate contains a high percentage of soluble protein, giving it superior dispersibility, solubility and emulsification properties, with a good flavor profile. It is an extremely functional soy protein supplement designed to improve texture and mouth-feel of food products by fortifying the myofibrillar proteins found in fish, meats, and poultry. It has a very bland flavor and can be used to fortify the protein content of food products.

The soy proteins used in the various examples described herein are commercially available from the Archer Daniels Midland Company ("ADM") of Decatur, Illinois. ADM soy protein isolate products, which are sold under the trademarks "PRO-FAM" and "ARDEX", are dry products which are highly dispersible, soluble, and functional. Another ADM product, sold under the trademark "ARCON", is a soy protein concentrate which has dispersibility, solubility and emulsification properties, with an excellent flavor profile.

Each of these and similar ADM products mentioned in the examples have been used for many years by food processors. These ADM soy protein isolates and concentrates are high quality proteins made from soybeans. Amino acid content and digestibility are two of the factors that make soy proteins high quality. The quality of the proteins may be measured by using known protein quality evaluation techniques. Therefore, it is highly desirable for any new process to make a meat extending protein crumble begin by using as many of the existing procedural steps as possible in order to eliminate the need for special training and to preserve existing production facilities.

Prior processes for making and using protein crumble have involved shipping frozen isolated soy protein, which means that the shipper has paid substantial freight and refrigeration charges for shipping ice. There would be a substantial savings if the material for making the crumble could be shipped in a dry form.

SUMMARY OF THE INVENTION

According, an object of this invention is to provide new and novel processes for producing protein crumble. In this connection, an object is to reduce the cost of producing such crumble by eliminating such things as heating cycles. Here, an object is to eliminate the need for shipping a wet product with a consequential higher transportation cost.

Another object of the invention is to provide new and novel soy protein crumble while preserving as much of the food processor's existing facilities as possible. Here, an object is to enable a multi-product production line where soy protein isolates may follow a single series of production steps before a feed stream branches off into separate product lines, one of which is the new and novel produce line for producing protein crumble.

In keeping with an aspect of the invention, these and other objects are accomplished by a new and improved process wherein:

1. protein crumbles are manufactured at ambient room temperature (15° to 25° C.).
2. Dry "PRO-FAM" or "ARDEX" isolated soy proteins are initially hydrated at ratios of about 3.5–5.0 parts of water to 1 part of protein.
3. The resulting hydrated soy protein isolate is chopped until a gel-like material is formed.
4. Various other food ingredients (e.g. soy protein concentrate, starch, wheat gluten, xanthan gum, locust bean gum, carrageenan, pectin and guar gum) are added.
5. The resulting product is chilled overnight and ground or chopped to form a soy protein crumble.

DETAILED DESCRIPTION OF THE INVENTION

In order to provide a control according to a prior art method for comparison and analysis with the inventive crumble, isolate crumbles were made from a soy protein isolate by chopping one part functional soy protein isolate with three parts hot water (60° C.) for approximately 4 minutes. The ratio of soy isolate to water was in the range of 2 to 3.5 parts of water to one part of soy isolate protein. A crumble made by this prior art process was used as a control in order to ascertain the amount of improvement provided by the inventive crumble.

The following six formulations are various examples of food ingredient combinations tested for their ability to provide a soy isolate crumble using ambient temperature (~75° F.; 24° C.) tap water. The formulations are set forth in terms of parts or percent (by weight).

EXAMPLE 1

A blend of isolated soy protein ("ISP") and xanthan/locust bean gum ("Xan/LBG") was formed when 1 part soy protein isolate was chopped with 3.75 parts tap water (24° C.) for about three minutes. The Xan/LBG was mixed together and chopped with the hydrated isolate for two additional minutes.

EXAMPLE 2

Isolated soy protein and starch were blended as follows: 1 part isolate with 3.75 parts water were chopped for three minutes in order to hydrate the isolate. Starch (Mira Flow, National Starch and Chemical Co.) was added 0.5 parts at a time until the product maintained consistency. A total of 2.5 parts of starch was added. The chopping time was extended to enable the repeated addition of the 0.5 parts starch.

EXAMPLE 3

Isolated soy protein and soy protein concentrate (SPC) were blended, as follows: 1 part isolated soy protein was chopped with 4.0 parts water for 3 minutes. Then 0.5 part soy protein concentrate was added and chopping continued for an additional 2 minutes.

EXAMPLE 4

Isolated soy protein and wheat gluten were blended, with a procedure which mirrored the procedure of Example 3.

EXAMPLE 5

Isolated soy protein and Xan/LBG (2×) were blended, using a procedure which was identical to the procedure of Example 1 except that the amount of Xan/LBG was doubled.

EXAMPLE 6

Isolated soy protein and soy protein concentrate were blended with Xan/LBG (1×), as follows: 1 part isolate was chopped with 4.0 parts water for 3 minutes. Then 0.5 part soy protein concentrate was added and chopping continued for an additional 1 minute. Then Xan/LBG was added and the mixture was chopped for an additional 1 minute.

TABLE 1

| | | \multicolumn{4}{c}{Screening Formulations (Parts)} | | | |
| Example | Treatment | Parts ISP | Parts Water (Temp) | Xan (% form.) | LBG (% form.) | Parts Starch | Parts SPC (Arcon S) | Parts Gluten |
| --- | --- | --- | --- | --- | --- | --- | --- | --- |
| | Control | 1.0 | 3.0 (60° C.) | — | — | — | — | — |
| 1 | ISP + Xan/LBG | 1.0 | 3.75 | 0.125% | 0.125% | — | — | — |
| 2 | ISP + Starch | 1.0 | 3.75 | — | — | 2.5 | — | — |
| 3 | ISP + SPC | 1.0 | 4.0 | — | — | — | 0.5 | — |
| 4 | ISP + Wheat Gluten | 1.0 | 4.0 | — | — | — | — | 0.5 |
| 5 | ISP + Xan/LBG (2×) | 1.0 | 4.0 | 0.3% | 0.3% | — | — | — |
| 6 | ISP + SPC + Xan/LBG (1×) | 1.0 | 4.0 | 0.15% | 0.15% | — | 0.5 | — |

TABLE 2

| Example | Treatment | ISP (%) | Water (%) | Xan (%) | LBG (%) | Starch (%) | SPC (%) (Arcon S) | Gluten (%) | Total |
|---|---|---|---|---|---|---|---|---|---|
|   | Control | 25.0 | 75.0 | — | — | — | — | — | 100.00 |
| 1 | ISP + Xan/LBG | 21.0 | 78.75 | 0.125 | 0.125 | — | — | — | 100.00 |
| 2 | ISP + Starch | 13.8 | 51.7 | — | — | 34.5 | — | — | 100.00 |
| 3 | ISP + SPC | 18.2 | 72.7 | — | — | — | 9.1 | — | 100.00 |
| 4 | ISP + Wheat Gluten | 18.2 | 72.7 | — | — | — | — | 9.1 | 100.00 |
| 5 | ISP + Xan/LBG (2×) | 20.0 | 79.4 | 0.3 | 0.3 | — | — | — | 100.00 |
| 6 | ISP + SPC + Xan/LBG (1×) | 18.2 | 72.5 | 0.15 | 0.15 | — | 9.0 | — | 100.00 |

The six formulations of the products made in the preceding examples were placed in a cooler overnight (2°–4° C.). The following day, the cooled gels were ground (3/16" plate) and evaluated for their potential of forming a cohesive crumble with the proper mouth-feel. The following Table 3 sets forth the test results:

of chopping. The spice/flavoring blend (Diversitech Colorlife™) was added during the final 30 to 45 seconds of crumble manufacture to prevent large color variations between the meat and protein crumble portions of the product.

TABLE 3

| Example | Treatment | Actual Chop Time | Evaluation of Crumble |
|---|---|---|---|
|   | Control | 5 min. | Good, firm |
| 1 | ISP + Xan/LBG | 5 min. | Good, firm |
| 2 | ISP + Starch | 6–7 min. | Grainy, soft |
| 3 | ISP + SPC | 5 min. | Good, firm |
| 4 | ISP + Wheat Gluten | 6 min. | Marginal, soft |
| 5 | ISP + Xan/LBG (2×) | 5 min. | Soft |
| 6 | ISP + SPC + Xan/LBG (1×) | 5 min. | Good, firm |

EXAMPLE 7

Pepperoni was manufactured by using the inventive crumble. Based on the screening evaluation set forth in Table 3, crumbles made by the methods of Examples 3 and 6 demonstrated the most potential for forming a properly textured crumble for use in the pepperoni.

The formulations of Examples 3 and 6 were prepared again and tested in a reduced fat traditional pepperoni formulation. The crumble formulations and chopping times were modified as listed in Table 4 below. In formulations containing SPC, the ISP was chopped 3 minutes followed by the addition of the SPC at the beginning of the final 1 minute

TABLE 4

| Treatment | Chop Time | Final Temp (°C.) | Evaluation of Crumble |
|---|---|---|---|
| Example 3 | 4 minutes | 27.9 | Good, firm |
| Example 6 | 4 minutes | 29.9 | Good, firm |

TABLE 5

| Treatment | Parts ISP | Parts Water | Xan (% form.) | LBG (% form.) | Parts SPC (Arcon S) | Colorlife ™ Season. |
|---|---|---|---|---|---|---|
| Example 3 | 1.0 | 4.0 | — | — | 0.4 | 0.4% |
| Example 6 | 1.0 | 4.0 | 0.1% | 0.1% | 0.4 | 0.4% |

TABLE 6

| Treatment | ISP (%) | Water (%) | Xan (% form.) | LBG (% form.) | SPC (%) (Arcon S) | Colorlife ™ Season. |
|---|---|---|---|---|---|---|
| Example 3 | 18.2 | 72.7 | — | — | 9.1 | 0.4% |
| Example 6 | 18.4 | 73.7 | 0.1% | 0.1% | 7.3 | 0.4% |

Following the crumble manufacture, the product was chilled overnight, ground 3/16" and incorporated into the following pepperoni formulation:

TABLE 7

| | Pepperoni Test Formulations | |
|---|---|---|
| Ingredient | Traditional Formulation (32% Fat, Control) | Reduced Fat Formulation (20% Fat) |
| Pork (95% lean) | 19.4 | 38.2 |
| Pork (72% lean) | 52.50 | 32.70 |
| Beef (50/50's) | 23.65 | 14.65 |
| Protein Gels | 0.00 | 10.00 |
| Nitrite | 0.07 | 0.07 |
| Nitrate | 0.28 | 0.28 |
| Salt | 3.10 | 3.10 |
| Dextrose | 0.60 | 0.60 |
| Colorlife ™ (Flavoring) | 0.38 | 0.38 |
| Starter Culture (Diversitech, HP-culture) | 0.02 | 0.02 |
| TOTALS | 100.00 | 100.00 |

Product Preparation of Pepperoni

The following process was used to prepare the pepperoni formulation as set forth on Table 7.
1. Coarse grind meat raw materials (½").
2. Place in mixer and add salt, nitrite/nitrate & dextrose and mix to incorporate ingredients. Mix minimally to prevent heat build-up and fat smearing.
3. Add Colorlife™/starter culture (~0.4% Colorlife™; 0.02% Starter Culture, Diversitech HP frozen) and mix to incorporate.
4. Add protein crumbles and mix to distribute.
5. Grind product again (3/16").
6. Stuff product into 2" (fibrous casings). The product should be kept cold to prevent fat smearing during stuffing step.
7. Temper product at 70° F. (21° C,) for 2 to 4 hours.
8. Ferment product at 100° F. (38° C.) and 85–90% RH for 12–14 hours or until pH reaches 5.1 or less.
9. Thermally process the product as indicated in the cooking cycle listed below.
10. Following fermentation and thermal processing the pepperoni sticks were placed in a 45°–55° F. (7°–13° C.) room at 40–60%RH and allowed to dry to a moisture-:protein ratio of 1.6:1 (~3–4 weeks).

TABLE 8

| STAGE | TIME | INTERNAL TEMP (°F.) | SMOKE | DRY BULB (°F.) | WET BULB (°F.) | AUTO DAMPER |
|---|---|---|---|---|---|---|
| 1 | 30 | — | — | 110 | 0 | on |
| 2 | 60 | — | — | 120 | 107 | on |

Hot/cold shower, temper.

The resulting pepperoni was judged completely successful. Both of the modified crumble formulations (Examples 3 and 6) produced pepperoni that compare closely to the traditional pepperoni manufactured as a control. The comparison was made in sensory quality as well as physical attributes such as particle definition, slicibility and textural changes during cooking.

Those who are skilled in the art will readily perceive how to modify the invention. Therefore, the appended claims are to be construed to cover all equivalent structures which fall within the true scope and spirit of the invention.

The invention claimed is:

1. A process for making a protein crumble comprising the steps of:

(a) chopping and blending one part soy protein isolate or soy protein concentrate with 3.5 to 5.0 parts water at ambient room temperature for a period of time adequate to hydrate said soy protein isolate;

(b) adding to the blend of step (a) a food ingredient combination including at least one powdered food ingredient taken from a group consisting of a vegetable protein and a complex carbohydrate;

(c) chopping material produced in step (b) for an additional period, the additional period being adequate to form a viscous gel materials, wherein a total chopping time for step a and c being in the range of about 3 to 7 minutes;

(d) cooling said viscous gel material of step (c) for enhancement of a textural integrity of the gel in step (c);

(e) separating said viscous gel material cooled in step (d) into discrete protein crumbles having a textural characteristic for use as a fat replacer or meat extender.

2. The process of claim 1 wherein step (b) said vegetable protein is taken from a group consisting of isolated soy protein, soy protein concentrate, soy flour, wheat flour, wheat gluten and ground mustard seed.

3. The process of claim 1 wherein said complex carbohydrate is a plant extract or extract produced by microbial fermentation of said carbohydrate, said complex carbohydrate being taken from a group consisting of xanthan gum, locust bean gum, carrageenan, guar gum, pectin, starch, algin, and various cellulose or starch derivatives.

4. The process in claim 1 wherein step (a) comprises one part soy protein chopped with about 4 parts ambient temperature water of about 75° F. (24° C.).

5. The process of claim 1 wherein the chopping of step (a) comprises chopping until said blend is a viscous gel material, said powdered food ingredient of step (b) is added to said viscous gel material, and said chopping in step (a) is approximately three to five minutes and said chopping in step (c) continues for approximately two to four additional minutes.

6. The process of claim 1 wherein said chopping of step (a) is for a period of about three minutes, and said complex carbohydrate is starch added during step (b) where a total amount of said starch equals about 34.5 percent of the total protein crumble.

7. The process of claim 1 wherein said soy protein isolate and water are in a ratio of about one part soy protein isolate to about four parts water, said chopping of step (a) is for about three minutes, said vegetable protein is wheat gluten which is added during step (b) where the amount is about 0.5 part wheat gluten for said part soy protein isolate, and said chopping of step (c) is for about two minutes.

8. The process of claim 1 wherein one part of said soy protein isolate of step (a) is chopped with about four parts water for a period of three minutes, half a part of soy protein concentrate is added in step (b) and chopped for an additional minute, then a mixture of equal parts xanthan gum and locust bean gum totaling about one third part for said part of said soy protein isolate and chopping for an additional minute.

* * * * *